United States Patent
Evans et al.

(10) Patent No.: US 7,441,075 B2
(45) Date of Patent: Oct. 21, 2008

(54) DATA STORAGE METHOD AND APPARATUS EMPLOYING A TAPE CARTRIDGE FOR STORING WORM DATA

(75) Inventors: Rhys Wyn Evans, Wales (GB); Paul Frederick Bartlett, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 11/082,536

(22) Filed: Mar. 17, 2005

(65) Prior Publication Data

US 2005/0223162 A1    Oct. 6, 2005

(30) Foreign Application Priority Data

Mar. 20, 2004   (GB)   ................... 0406320.2

(51) Int. Cl.
*G06F 12/00* (2006.01)
(52) U.S. Cl. .................. 711/111; 711/163; 711/164
(58) Field of Classification Search ................. None
See application file for complete search history.

(56) References Cited

U.S. PATENT DOCUMENTS 6,339,810 B1 * 1/2002 Basham et al. .............. 711/111

6,775,087 B2 * 8/2004 Chan et al. .................. 360/74.1

FOREIGN PATENT DOCUMENTS

| JP | 54058012 A | * | 5/1979 |
| JP | 02206062 A | | 8/1990 |
| WO | WO 97/29484 A2 | | 8/1997 |

OTHER PUBLICATIONS

GB Search Report dated Jun. 3, 2004.

* cited by examiner

*Primary Examiner*—Reginald G. Bragdon
*Assistant Examiner*—Shawn X Gu

(57) ABSTRACT

Data storage apparatus comprises a tape drive and a tape cartridge, the tape cartridge having a data storage tape on which write-once-read-many (WORM) data is stored. The data storage apparatus is controlled by providing a format command to the tape drive commanding a formatting operation that conditions the tape for erasure or overwriting of the WORM data. A format command key is provided with the format command to be compared with a key recorded in the cartridge. The format command is enabled in dependence upon the comparison between the format command key and the recorded key.

27 Claims, 4 Drawing Sheets

DATA STORAGE METHOD AND APPARATUS EMPLOYING A TAPE CARTRIDGE FOR STORING WORM DATA

TECHNICAL FIELD

This invention concerns the control of data storage apparatus comprising a tape drive and a tape cartridge having a storage tape to store write-once-read-many (WORM) data.

CLAIM TO PRIORITY

This application claims priority to copending United Kingdom utility application entitled, "DATA STORAGE METHOD AND APPARATUS EMPLOYING A TAPE CARTRIDGE," having serial no. GB0406320.2, filed Mar. 20, 2004, which is entirely incorporated herein by reference.

BACKGROUND

Tape cartridges in use today incorporate a magnetic tape having data tracks for recording a succession of units of information known as data sets. Each data set consists of a data region within which data is recorded and a data set information table that describes the content of the data region. Data to be recorded is sent to the cartridge by a tape drive and is recorded within the data regions. The data set information table for each data set has a multiplicity of fields each of which has a pre-allocated number of bytes of storage. The fields store records of information such as the data set number, the valid data length, the data set type, and the drive manufacturer identity.

Data written to the tape may be protected from being overwritten. Such data is protected by drive level processing that renders the tape as write-once-read-many (WORM) protected. When trying to protect data written to tape in a WORM environment, safeguards are implemented to prevent the data from being overwritten, accidentally or intentionally.

An inherent feature of WORM data is that, once written, it is protected from being overwritten. Whilst this is desirable for reasons of data integrity and protection, it has the drawback that the media on which the data is recorded may not be re-used when the retention period of the data has expired. One solution has been to destroy the cartridge. This is costly for the user and is also not environmentally friendly.

Another solution has been proposed in which a time stamp is recorded when the data is written. The time stamp is received from a host controlling the tape drive or is generated by the tape drive itself and is used to determine a retention period of the recorded data. Overwriting or erasure of the data is controlled by reference to the time stamp. A difficulty with this solution is that this information must be carefully managed to make robust and secure decisions to allow the erasure of WORM data recorded in the cartridge. Furthermore, recorded time stamps do not allow for flexibility in cases where the retention period has to be changed, for example in relation to data that has to be retained for an enquiry into an insurance claim or a financial investigation.

SUMMARY

According to the present invention, there is provided a method of controlling a tape drive into which a tape cartridge is loaded, the tape cartridge having a data storage tape on which write-once-read-many (WORM) data is stored in data sets, the method comprising:

providing a format command to the tape drive system commanding a formatting operation that overwrites an existing one of the WORM data sets to represent an end of data (EOD) data set thereby conditioning the tape for erasing or overwriting of the WORM data, the format command including a format command key; and enabling the format command under the control of the format command key.

Further according to the present invention, there is provided a data storage apparatus comprising a tape drive and a tape cartridge, the tape cartridge having stored therein a key and a data storage tape on which write-once-read-many (WORM) data is stored in data sets, the data storage apparatus being programmed to provide a format command to the tape drive commanding a formatting operation that overwrites an existing one of the data sets to represent an end of data (EOD) data set thereby conditioning the tape for overwriting of the WORM data, the command including a format command key, the data storage apparatus being further programmed to compare the format command key to the key recorded in the cartridge and to enable the format command in dependence upon the comparison between the format command key and the key stored in the cartridge.

DESCRIPTION OF THE DRAWINGS

The invention will now be described, by way of example only, with reference to the accompanying drawings in which.

DETAILED DESCRIPTION

Figure 1:
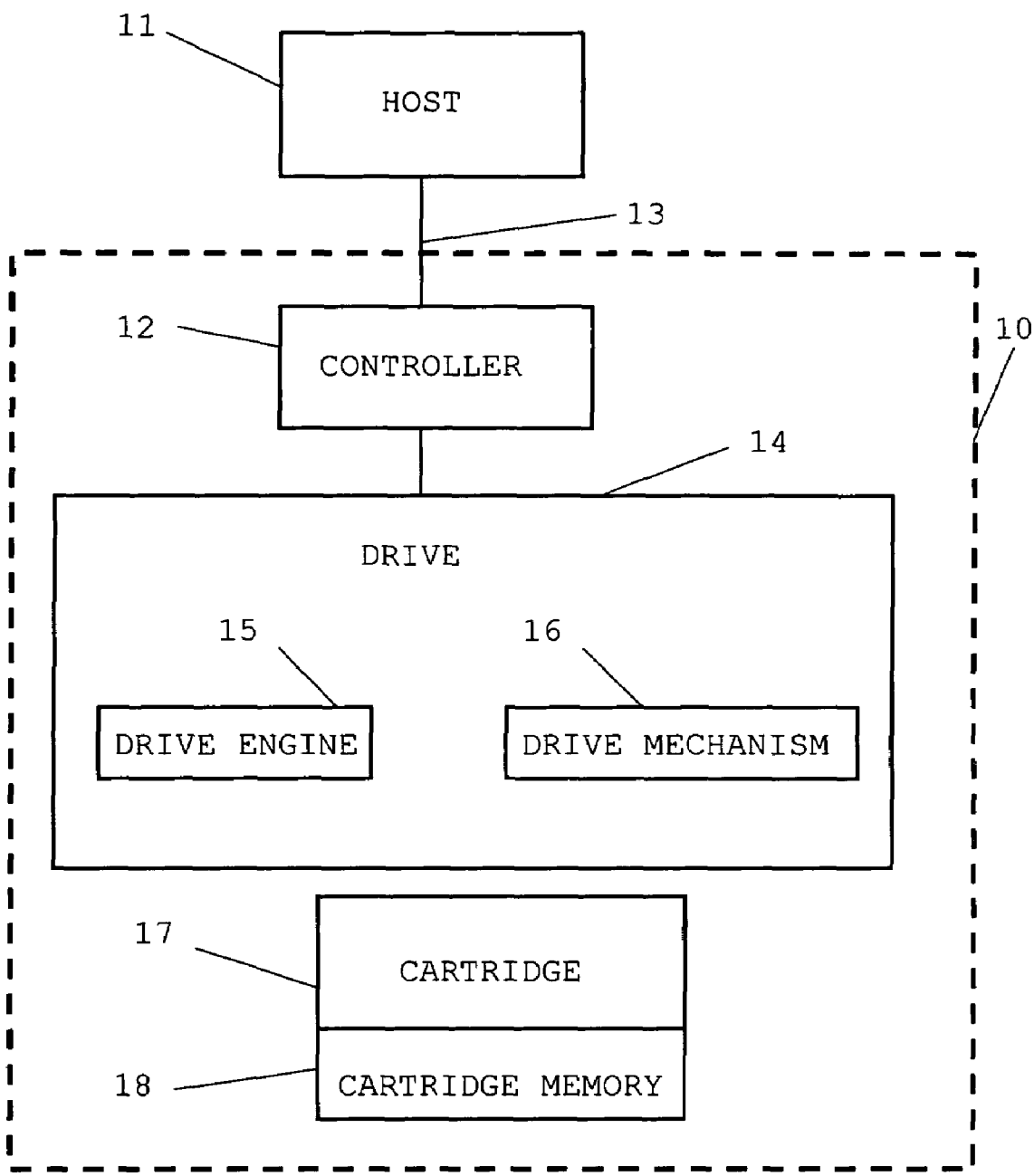
FIG. 1 is a block diagram of the hardware components and interconnections of a data storage system according to the present invention.

Referring to FIG. 1, there is shown a data storage apparatus 10 embodiment coupled to at least one hierarchically superior host 11. The data storage apparatus includes a controller 12 connected to the host 11 by an interface 13. The data storage apparatus also includes a tape drive 14, including a drive engine 15 and drive mechanism 16, that receives a tape cartridge 17. The tape cartridge optionally has a cartridge memory 18. A controlling software application on the host 11 controls the tape drive 14 to read data from and write data to the tape storage cartridge 17.

The host system 11 has at least one central processing unit (CPU) and a memory to store the controlling software application. The interface 13 connecting the host system 11 to the data storage apparatus 10 is preferably a Small Computer Systems Interface (SCSI) or a USB (Universal Serial Bus). The method of communication over either of these standard busses is known to those skilled in the art. Other busses may alternatively be used including an FC, iSCSI or SAS bus.

The drive mechanism 16 includes electrical and mechanical components that receive, position and access tape cartridges. The drive mechanism has components to lock a tape cartridge in place, an ejection motor and read/write heads. The drive engine 15 is a data processor that is programmed to supervise the operation of the drive mechanism 16 and to manage the flow of data to be recorded in or read from a tape cartridge 17 received in the drive 14. Importantly, the drive engine 15 controls the process of recording and reading the data to provide protection of the data as will be explained in greater detail below.

Figure 2:
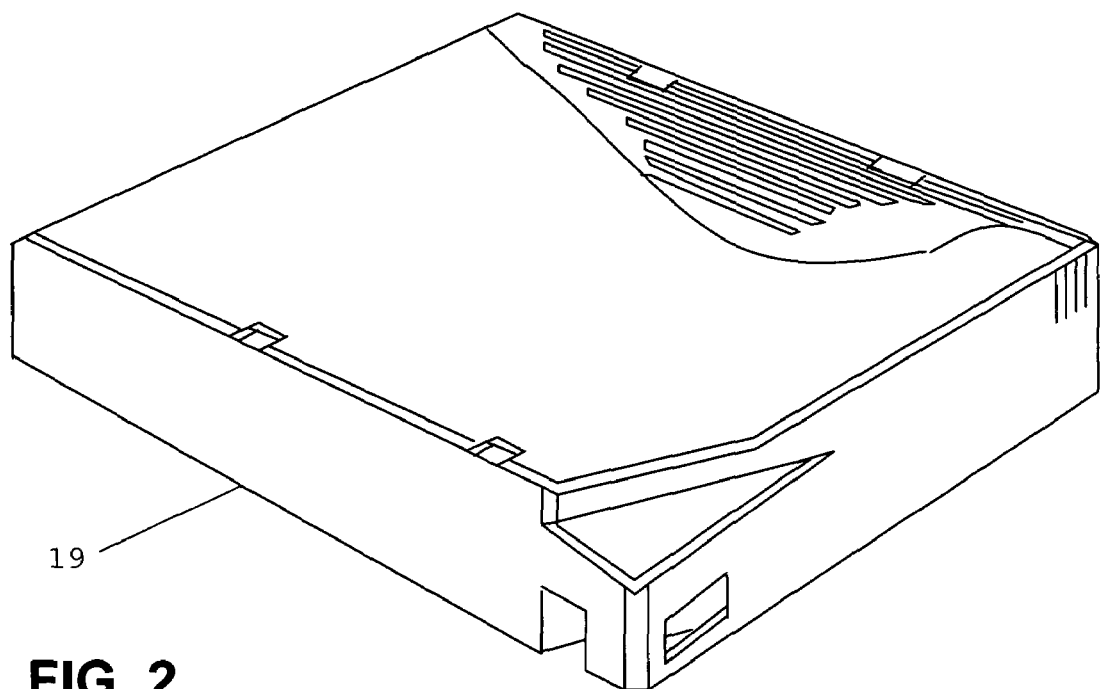
FIGS. 2 and 3 show a tape cartridge included in the system of FIG. 1.
Figure 3:
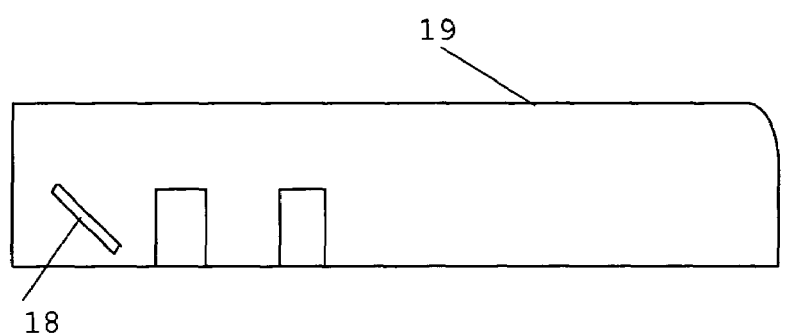

FIGS. 2 and 3, show a general view of the cartridge 17 including a structural casing 19 within which are located the cartridge memory 18 and a magnetically recordable tape. The cartridge is an implementation of Linear Tape Open (LTO) technology. The tape is supported on a rotatable tape reel or spool and has a leader by means of which the tape drive 14 can uncoil and withdraw the tape from the cartridge reel or spool for data reading or recording.

Figure 4:
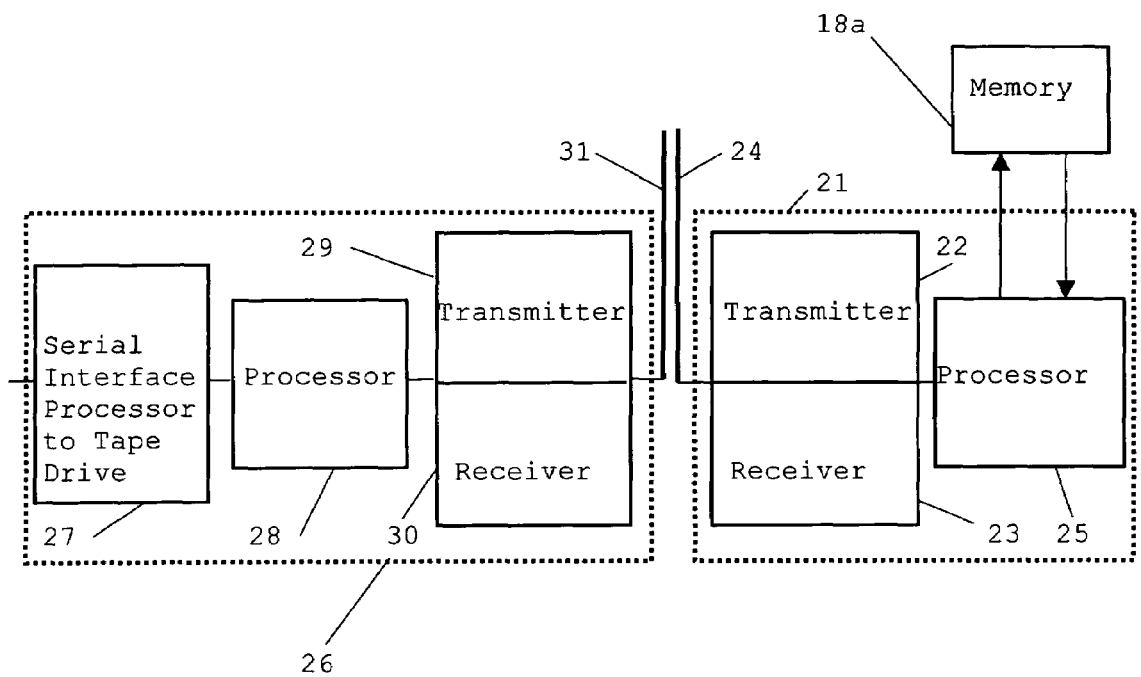
FIG. 4 is a block diagram of transponders and memory included in the data storage apparatus of FIG. 1.

Referring to FIG. 4, the cartridge memory 18 includes a transponder 21 and a memory area 18a that has the capability of non-volatile storage and is preferably an EEPROM (electronically erasable programmable read only device). The transponder 21 consists of a transmitter 22, a receiver 23, an aerial 24 and a processor 25. The cartridge memory 18 co-operates with a transmitter/receiver module 26 incorporated into the tape drive 14. The module 26 includes a serial interface 27 to the tape drive, a processor 28, a transmitter 29, a receiver 30 and an aerial 31. The transponder 21 incorporated into the cartridge 17 is inductively powered by the transmitter/receiver module 26 and data is exchanged between the transmitter/receiver 22,23 of the transponder 21 and the transmitter/receiver 29,30 of the module 26 by way of the inductively coupled aerials 24 and 31. The aerials 24 and 31 thus provide a contactless coupling of the cartridge memory 18 to the tape drive 14 for data transfer between the cartridge memory and the tape drive when the tape cartridge 17 has been received by the tape drive. In the case where the cartridge is to be WORM protected, the information provided by the cartridge memory indicates that the cartridge is WORM protected and that WORM protected data written to the tape is not to be overwritten.

The cartridge memory area 18a stores information including usage information, cartridge manufacturer information and cartridge memory manufacturer information. The cartridge manufacturer information includes the cartridge type, a serial number of the cartridge and an identification of the manufacturer. The cartridge memory manufacturer information includes the serial number of the transponder, the type of transponder and the serial number of the cartridge memory.

The provision of information by the cartridge memory 18 to the drive 14 indicating that the cartridge 17 is a WORM protected cartridge means that the WORM data, once written, is protected from being overwritten. This is desirable for reasons of data integrity and protection. However, as will be explained below, the tape drive 14 can operate according to a formatting procedure to enable re-use of the cartridge 17 once the retention period of the WORM protected data has expired.

Figure 5:
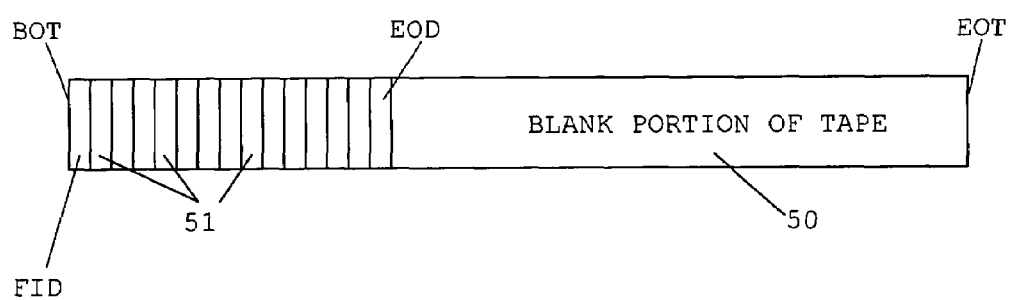
FIG. 5 is a logical diagram of the manner of recording data on a data storage tape included in the cartridge of FIGS. 2 and 3.

Referring to FIG. 5, the storage tape within the cartridge 17 is referenced as 50. The tape 50 is shown as having data arranged in a logical format starting at the beginning of tape BOT and ending at the end of tape EOT. Data sets are recorded along the tape 50 from the beginning of the tape BOT. The first data set is a format identification data set FID followed by a series of user data sets 51 and ending with an end of data set EOD. The formatting of the tape 50 is undertaken by the tape drive 14 in response to format commands received by the drive 14 from the host 11.

Figure 6:
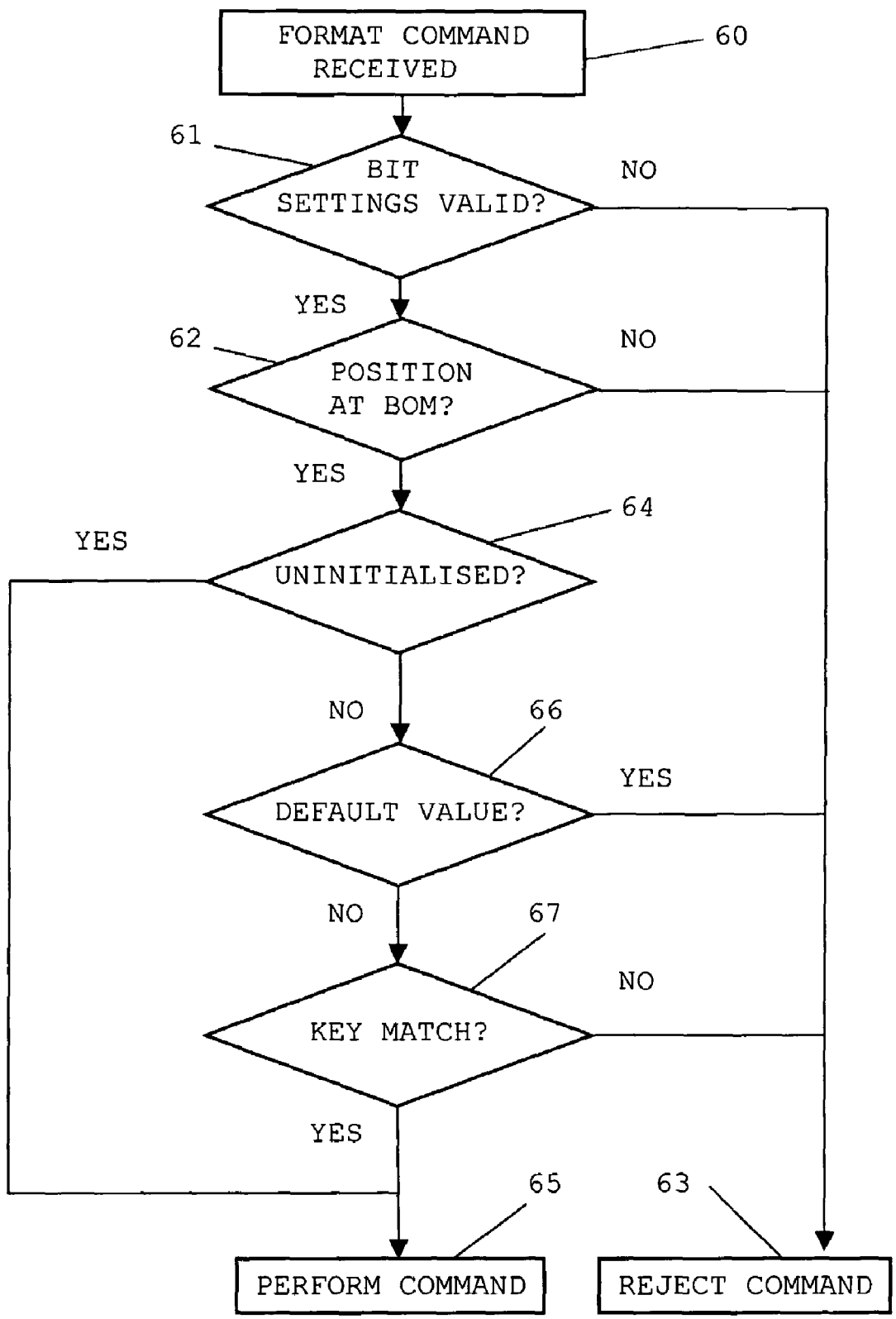
FIG. 6 is a flow diagram illustrating steps in a method embodying the present invention.

The formatting operations carried out by the tape drive 14 will now be described with reference to the flow diagram of FIG. 6. In a first step 60, a format command including a format command key value of 16 bytes is sent by the host 11 to the tape drive 14. The purpose of the format command key value will be explained below. In step 61, the drive engine 15 checks that all the bit settings in the command are valid and, if so, the process moves on to step 62. If the check carried out in step 61 is negative, the process is ended in the reject step 63. In step 62, the drive engine determines if the logical position of the tape 50 is at a beginning of media (BOM) position. If so, the process moves to step 64 where a test is made to determine whether the cartridge 17 is blank. In the case where the cartridge is blank, the tape 50 has no format information and so will not have had a format identification data set (FID) recorded at the beginning of the tape. In this blank state, the cartridge is regarded as uninitialised. In the case where the tape has a format identification data set FID recorded at the beginning of the tape, the cartridge is regarded as initialised.

If the determination in step 64 is that the cartridge is uninitialised, the process moves to step 65 in which a format operation is performed on the cartridge 17. The format operation comprises recording the format command key value within the cartridge. This format command key value is recorded on the tape 50 in a position that is inaccessible to the user. After having been initialised, the host will not be able to access the key value again during the normal operations of writing data to the cartridge 17 or reading data from the cartridge 17. The key value is therefore securely located within the cartridge 17 and remains secure within the cartridge until such time as it is desired to erase or overwrite the WORM protected data stored in the cartridge 17. This would normally be when the retention period for the WORM protected data has expired. To provide additional security, the key value may be encrypted before it is recorded. Alternatively, the key value may be stored in the cartridge memory 18 but this provides a less secure location for the key value because the cartridge memory 18 could be removed from the cartridge to be replaced by an unauthorised replacement.

Reverting to step 64, if the cartridge 17 has been initialised, the format command enables the tape drive to read the key value stored in the cartridge and to move to step 66. In step 66, a determination is made whether the stored key value is a default value. A default value is recorded in those instances where it is desired that the WORM protected data should remain protected indefinitely. In other words the retention period will never expire. The WORM protected data may also be protected indefinitely if write commands for writing the data are sent to the drive before a format command has been sent.

The default 16 byte value may be any arbitrary value but is preferably a value of zero. If the determination in step 66 is that the key value stored in the cartridge 17 is the default value, the process moves to step 63 and is terminated. If the determination in step 66 is that the key value is not the default value, the cartridge will have WORM protected data that has a specified retention period known to the owner of the data and signified by the key value. The process then moves to step 67.

In step 66, the key value read from the cartridge 17 in response to the format command is compared by the drive 14 with the key value included in the format command. If the key value has been encrypted, additional security is provided by the need to decrypt the key value before it can be checked. In the event that the key values match one another, the tape drive formats the tape 50 in response to the format command. The format command may perform what may be termed a short erase operation. In the short erase operation, the first data set following the format identification data set FID is overwritten to represent the end of data (EOD) data set. This operation will then allow the tape drive 14 to overwrite all the WORM protected data sets following the newly written end of data (EOD) data set. Alternatively, the format command may perform a long erase operation according to which the short erase operation is supplemented by the further steps of erasing all the data sets following the newly written end of data set (EOD). The long erase operation may be preferred in those cases where sensitive data such as medical records are recorded in the tape cartridge 17 and it is desired to make a positive effort to eradicate the data. In the event that the determination in step 67 is that the format command key value does not match the key value recorded on the storage tape in the cartridge 17, the process is terminated in step 63.

The formatting operation need not be performed at the beginning of the data storage tape in the tape cartridge 17 but at some later intermediate point from which a short or long erase operation is required. In such a formatting operation, the first data set occurring after the intermediate point is overwritten to represent the end of data (EOD) data set.

The format command key value described above is used to control the manner in which the tape in the cartridge 17 is formatted. A key value may also be used in conjunction with a write command used to append data sets to the tape 50. Such a write append key value may thereby be used to prevent access to the tape to perform a write append operation unless immediately preceded by the correct write command key value. Access to the tape may be further controlled by using a key value in conjunction with a read command so that a read operation is prevented unless the read command is preceded by the correct read command key value. The control over access to the tape by means of write command key values and read command key values may be used to secure sensitive data such as medical records.

What is claimed is:

1. A method of controlling a data storage apparatus that comprises a tape drive and a tape cartridge, the tape cartridge having a data storage tape on which write-once-read-many (WORM) data is stored in data sets, the method comprising:
   recording a key within the cartridge;
   providing a format command to the tape drive commanding a formatting operation that overwrites an existing one of the data sets to represent an end of data (EOD) data set thereby conditioning the tape for overwriting of the WORM data;
   providing a format command key with the format command, comparing the format command key with the key recorded in the cartridge; and
   enabling the format command in dependence upon the comparison between the format command key and the key recorded in the cartridge.

2. A method as claimed in claim 1, in which the formatting operation both overwrites the existing data set to represent an end of data (EOD) data set and erases the WORM data following the end of data (EOD) data set.

3. A method as claimed in claim 1, in which the key recorded within the cartridge is the key recorded on the data storage tape.

4. A method as claimed in claim 1, in which the tape cartridge includes a cartridge memory and the key recorded within the cartridge is the key recorded within the cartridge memory.

5. A method of controlling data storage apparatus that comprises a tape drive and a tape cartridge, the tape cartridge having a data storage tape on which write-once-read-many (WORM) data is stored in data sets, the method comprising:
   providing a format command to the tape drive commanding a formatting operation that overwrites an existing one of the data sets to represent an end of data (EOD) data set thereby conditioning the tape for overwriting of the WORM data.

6. A method as claimed in claim 5, in which the formatting operation both overwrites the existing data set to represent the end of data (EOD) data set and erases the WORM data following the end of data (EOD) data set.

7. A method as claimed in claim 5, further comprising:
   providing a format command key with the format command;
   recording a key within the cartridge;
   comparing the format command key with the key recorded in the cartridge; and
   enabling the format command in dependence upon the comparison between the format command key and the key recorded within the cartridge.

8. A method as claimed in claim 7, in which the key recorded within the cartridge is the key recorded on the data storage tape.

9. A method as claimed in claim 7, in which the tape cartridge includes a cartridge memory and the key recorded within the cartridge is the key recorded in the cartridge memory.

10. A method of controlling a tape drive system into which a tape cartridge is loaded, the tape cartridge having a data storage tape on which write-once-read-many (WORM) data is stored in data sets, the method comprising:
    providing a format command key; and
    providing a format command to the tape drive system commanding a formatting operation that overwrites an existing one of the WORM data sets to represent an end of data (EOD) data set thereby conditioning the tape for overwriting of the WORM data,
    wherein the format command is enabled under the control of the format command key.

11. A method as claimed in claim 10, further comprising:
    recording a key within the cartridge;
    comparing the format command key with the key recorded in the cartridge; and
    enabling the format command in dependence upon the comparison between the format command key and the key recorded within the cartridge.

12. A data storage apparatus comprising a tape drive and a tape cartridge, the tape cartridge having stored therein a key and a data storage tape on which write-once-read-many (WORM) data is stored in data sets, the data storage apparatus being programmed to provide a format command to the tape drive commanding a formatting operation that overwrites an existing one of the data sets to represent an end of data (EOD) data set thereby conditioning the tape for overwriting of the WORM data, the command including a format command key, the data storage apparatus being further programmed to compare the format command key to the key recorded in the cartridge and to enable the format command in dependence upon the comparison between the format command key and the key stored in the cartridge.

13. Apparatus as claimed in claim 12, in which the formatting operation both overwrites the existing one of the data sets to represent the end of data (EOD) data set and erases the WORM data following the end of data (EOD) data set.

14. Apparatus as claimed in claim 12, in which the key recorded within the cartridge is the key recorded on the data storage tape.

15. Apparatus as claimed in claim 12, in which the tape cartridge includes a cartridge memory and the key stored within the cartridge is the key recorded within the cartridge memory.

16. A data storage apparatus that comprises a tape drive and a tape cartridge, the tape cartridge having a data storage tape on which write-once-read-many (WORM) data is stored in data sets, the apparatus being programmed to provide a format command to the tape drive commanding a formatting operation that overwrites an existing one of the data sets to represent an end of data (EOD) data set thereby conditioning the tape for overwriting of the WORM data.

17. Apparatus as claimed in claim 16, wherein the cartridge has a key stored therein and the apparatus is further programmed to provide a format command key with the format command, to compare the format command key with the key stored in the cartridge, and to enable the format command in dependence upon the comparison between the format command key and the key stored within the cartridge.

18. Apparatus as claimed in claim 17, in which the key stored within the cartridge is the key recorded on the data storage tape.

19. A method of controlling data storage apparatus that comprises a tape drive and a tape cartridge, the tape cartridge having stored therein a data storage tape on which to store write-once-read-many (WORM) data in data sets, the method comprising:
providing a first format command to the tape drive commanding a formatting operation that records a key in the cartridge and conditions the tape for recording the WORM data,
recording the WORM data in the data sets on the tape;
providing a second format command to the tape drive commanding a formatting operation that overwrites an existing one of the data sets to represent an end of data (EOD) data set thereby conditioning the tape for overwriting of the WORM data;
providing a format command key with the second format command;
comparing the format command key with the key recorded in the cartridge; and
enabling the second format command in dependence upon the comparison between the format command key and the recorded key.

20. A data storage apparatus comprising a tape drive and a tape cartridge, the tape cartridge having a data storage tape on which to store write-once-read-many (WORM) data, the apparatus being programmed to undertake the steps of:
providing a first format command to the tape drive commanding a formatting operation that records a key in the cartridge and conditions the tape for recording the WORM data;
recording the WORM data in data sets on the tape;
providing a second format command to the tape drive commanding a formatting operation that overwrites an existing one of the data sets to represent an end of data (EOD) data set thereby conditioning the tape for erasure or overwriting of the WORM data;
providing a format command key with the second format command;
comparing the format command key with the key recorded in the cartridge; and
enabling the second format command in dependence upon the comparison between the format command key and the recorded key.

21. A host computer system to control data storage apparatus that comprises a tape drive and a tape cartridge, the tape cartridge having stored therein a key and a data storage tape on which write-once-read-many (WORM) data is stored in data sets, the host computer system having a processor being programmed to provide a format command to the tape drive commanding a formatting operation that overwrites an existing one of the data sets to represent an end of data (EOD) data set thereby conditioning the tape for overwriting of the WORM data, the host computer system being further programmed to provide a format command key with the format command, to compare the format command key with the key recorded in the cartridge, and to enable the format command in dependence upon the comparison between the format command key and the recorded key.

22. A host computer system as claimed in claim 21, in which the formatting operation both overwrites the existing one of the data sets to represent the end of data (EOD) data set and erases the WORM data following the end of data (EOD) data set.

23. A host computer system as claimed in claim 21, in which the key stored within the cartridge is recorded on the data storage tape.

24. A host computer system as claimed in claim 21, in which the tape cartridge has a cartridge memory and the key stored within the tape cartridge is recorded in the cartridge memory.

25. A computer readable medium encoded with a computer program that, when loaded on a host system, is effective to control data storage apparatus that comprises a tape drive and a tape cartridge, the tape cartridge having stored therein a key and a data storage tape on which write-once-read-many (WORM) data is stored in data sets, the computer program being operative to cause the host system to provide a format command to the tape drive commanding a formatting operation that overwrites an existing one of the data sets to represent an end of data (EOD) data set thereby conditioning the tape for overwriting of the WORM data, the computer program being further operative to cause the host system to provide a format command key with the format command, to compare the format command key with the key stored in the cartridge, and to enable the format command in dependence upon the comparison between the format command key and the key stored in the cartridge.

26. A computer readable medium as claimed in claim 25, in which the formatting operation both overwrites the existing data set to represent the end of data (EOD) data set and erases the WORM data following the end of data (EOD) data set.

27. A method of controlling a tape drive into which a tape cartridge is loaded, the tape cartridge having a data storage tape on which write-once-read-many (WORM) data is stored in data sets, the method comprising:
providing a format command to the tape drive system commanding a formatting operation that overwrites an existing one of the WORM data sets to represent an end of data (EOD) data set thereby conditioning the tape for erasing or overwriting of the WORM data, the format command including a format command key; and
enabling the format command under the control of the format command key.

* * * * *